No. 877,543. PATENTED JAN. 28, 1908.
W. R. BEERS.
DEVICE FOR CONVERTING WINDMILL POWER.
APPLICATION FILED APR. 19, 1907.
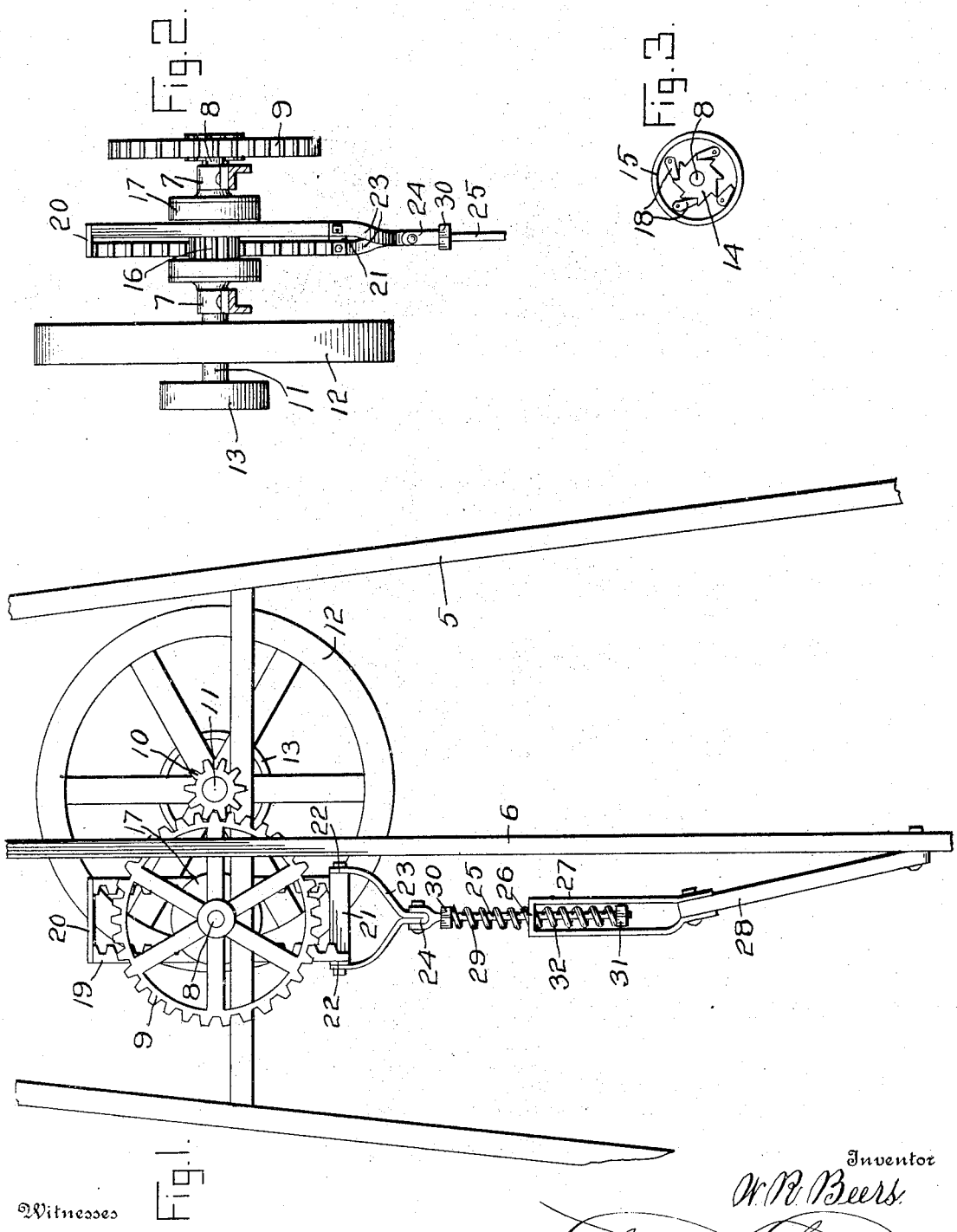

UNITED STATES PATENT OFFICE.

WILLIAM R. BEERS, OF JUDD, IOWA.

DEVICE FOR CONVERTING WINDMILL-POWER.

No. 877,543.  Specification of Letters Patent.  Patented Jan. 28, 1908.

Application filed April 19, 1907. Serial No. 369,107.

*To all whom it may concern:*

Be it known that I, WILLIAM R. BEERS, a citizen of the United States, residing at Judd, in the county of Webster, State of Iowa, have invented certain new and useful Improvements in Devices for Converting Windmill-Power; and I do hereby declare the following to be a full, clear, and exact description of the invention, such as will enable others skilled in the art to which it appertains to make and use the same.

This invention relates to devices for converting reciprocatory into rotary motion and one object of the invention is to provide a device of this class which may be readily applied to windmills for the purpose of converting the reciprocatory movement of the pump rod into rotary motion for driving churns, washing machines and other like machinery.

A further object of the invention is to provide means whereby the mechanism may be readily connected with the pump rod when it is desired to obtain power from the same.

A still further object of the invention is to provide means for cushioning the connection of the mechanism with the pump rod.

In the accompanying drawings, Figure 1 is a front elevation of a portion of a windmill showing the application of my invention thereto. Fig. 2 is a side elevation of a portion of the mechanism embodying my invention, and, Fig. 3 is a detail view in elevation of one of the pawl and ratchet devices.

In the drawings the frame of the windmill is indicated in general by the numeral 5 and the windmill pump rod by the numeral 6.

Journaled in suitable bearings 7 in the frame of the windmill is a shaft 8 upon the forward end of which is secured a gear wheel 9 which is in mesh with a pinion 10 upon a shaft 11 also journaled in the frame and in parallel relation with the shaft 8. Fixed upon the shaft adjacent its rear end is a fly wheel 12 and beyond this fly wheel a belt pulley 13.

Fixedly mounted upon the shaft 8 for rotation therewith are ratchets 14 and these ratchets are inclosed by casings 15 which are of cylindrical construction and have formed integral with their inner faces pinions 16, it being understood that there are two such ratchets and two such casings, the inner faces of the casing being in opposed relation as are also the pinions 16 although these pinions are but very slightly spaced apart. Each casing includes a removable face plate 17 which closes the outer open ends of the casings. Upon the inner faces of the opposing ends of the casing there are pivoted a number of pawls 18 which are designed for engagement with the respective ratchets 14 it being understood that the casing and their pinions 16 are mounted loosely upon the shaft 8 and are designed to be clutched therewith through the instrumentality of the pawls and the ratchets.

A rack device is employed for alternately clutching the pinions 16 with the shaft 8 and this rack device will now be described. The device mentioned above comprises a pair of side members 19 which are of rack formation upon their inner edges and are connected at their upper ends by means of a cross piece 20 and at their lower ends by means of a bar 21 which has its ends bent in opposite directions as at 22 and secured to the said side members, this bar being adapted to position the members in opposition to each other and in parallel planes. In other words one of the members has its rack edge in mesh with one of the pinions 16 and the other member has its corresponding edge in mesh with the other pinion 16, the said members being positioned upon opposite sides of the shaft 8 as will be readily understood. A yoke 23 is secured at its ends to the lower ends of the rack members 19 and connected to the yoke at its middle is the bifurcated upper end 24 of a rod 25. This rod is slidably engaged through the connecting portion 26 of a yoke 27 and this yoke is connected by means of a bar 28 with the pump rod 6. A spring 29 is engaged upon the rod 25 and bears at its upper end against the rod 25 upon the said rod and at its lower end against the upper face of the connecting portion 26, and bearing at its lower end against a nut 31 upon the lower end of the rod 25 is a spring 32 which at its upper end bears against the under face of the connecting portion 26.

From the foregoing description of my invention it will be observed that motion is transmitted from the windmill pump rod 6, by way of the bar 28, the rod 25 and the yoke 23 to the rack frame of the device and that downward movement of this rack frame will serve to clutch one of the pinions 16 with the shaft 8, the other pinion being allowed to run loose and that upon upward movement of the rack the other pinion will be clutched with the shaft to continue the rotation thereof in the direction in which it was initially rotated by the clutching of the first mentioned pinion 16 therewith. It will be further understood that the springs 29 and 32 serve very effectually to cushion the movement of the rack frame with respect to the pump rod 6 and that hence the working parts are not subjected to the strain which would otherwise result.

What I claim is:—

The combination with a reciprocatory rod, of a shaft, a shaft mounted parallel to the first named shaft, gear connections between the two shafts, a drive pulley carried by the second named shaft, pinions loosely mounted upon the first shaft, clutch devices for clutching the pinions with the shaft in such a manner that when one of the pinions is clutched with the shaft the other will run loose, a rack element comprising a frame made up of a pair of offset rack bars, a strip having its ends bent at right angles in opposite directions and bolted to the rack bars at their lower ends whereby the bars will be held in offset relation, a yoke depending from the lower end of the rack element, a bar connected to the reciprocatory rod and extending upwardly at an angle therefrom, a yoke carried at the upper end of the bar and provided through its connecting portion with an opening, a rod slidably engaged through the opening and connected with the lower end of the yoke carried at the lower end of the rack member, the said rod being threaded, nuts engaged upon the rod adjacent each of its ends and adjustable longitudinally thereof, and springs engaged upon the rod one above and the other below the connecting portion of the yoke carried at the upper end of the bar the upper spring having its upper end bearing against the upper nut upon the rod and its lower end against the connecting portion of the yoke and the lower spring having its upper end bearing against the connection portion of the yoke and its lower end against the other nut upon the rod, substantially as described.

In testimony whereof, I affix my signature, in presence of two witnesses.

WILLIAM R. BEERS.

Witnesses:
W. W. SIMPSON,
NORMAN THOMPSON.